(No Model.) 4 Sheets—Sheet 1.

W. W. KEYS.
MELTING FURNACE.

No. 452,794. Patented May 26, 1891.

WITNESSES:
J. V. Finch
Chas H. Fleming

INVENTOR
William W. Keys
BY F. W. Smellter ATT'Y (No Model.) 4 Sheets—Sheet 2.

W. W. KEYS.
MELTING FURNACE.

No. 452,794. Patented May 26, 1891.

WITNESSES:

INVENTOR
William W. Keys (No Model.) 4 Sheets—Sheet 3.
W. W. KEYS.
MELTING FURNACE.
No. 452,794. Patented May 26, 1891.
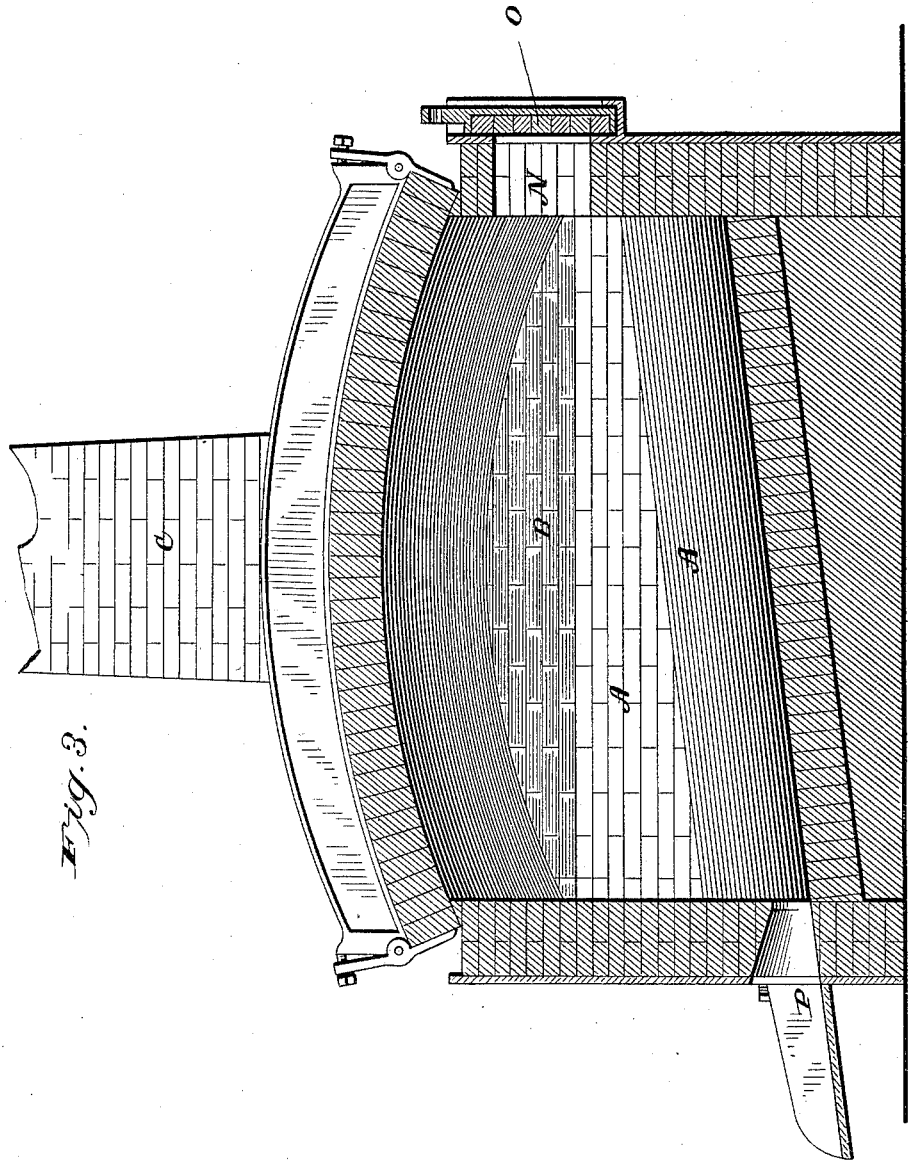
WITNESSES:
INVENTOR
William W. Keys
BY ATT'Y (No Model.) 4 Sheets—Sheet 4.
W. W. KEYS.
MELTING FURNACE.
No. 452,794. Patented May 26, 1891.
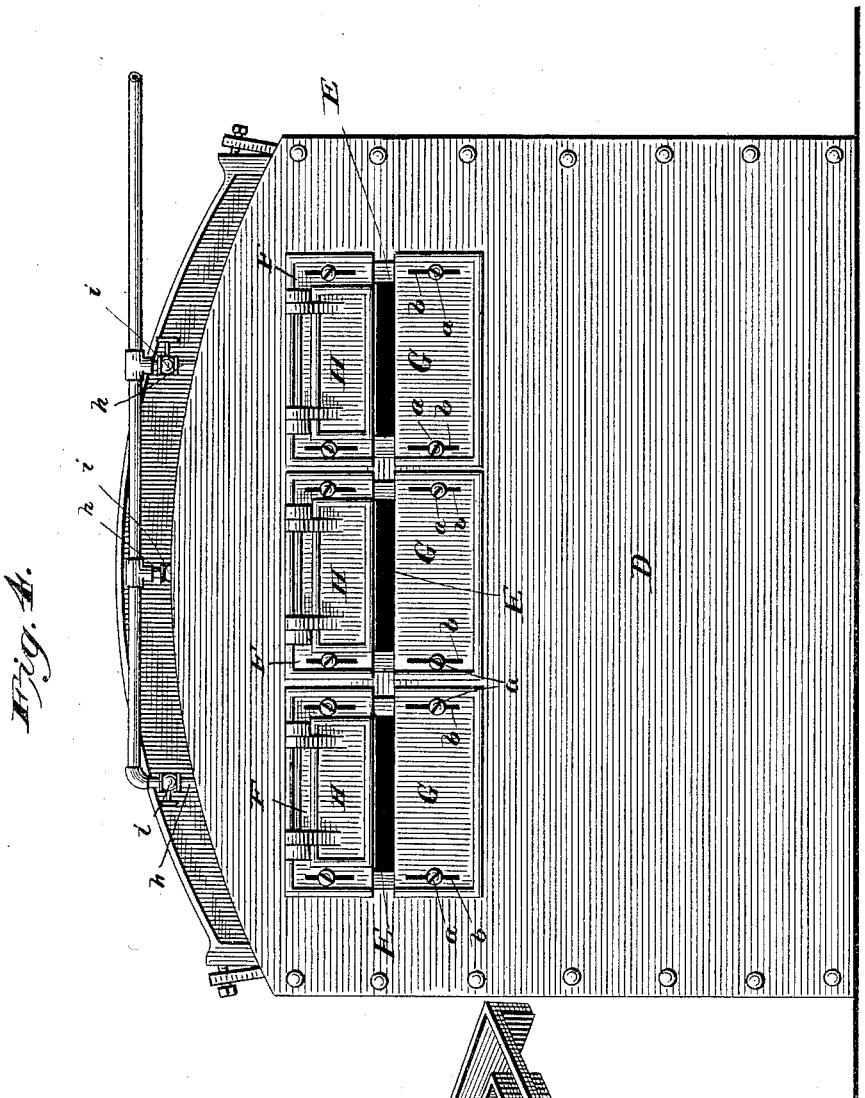
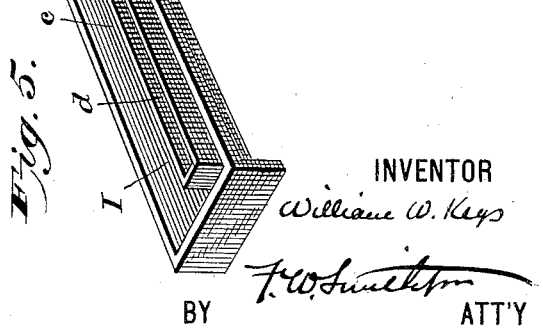
WITNESSES:
INVENTOR
William W. Keys
BY ATT'Y

United States Patent Office.

WILLIAM W. KEYS, OF BRIDGEPORT, CONNECTICUT.

MELTING-FURNACE.

SPECIFICATION forming part of Letters Patent No. 452,794, dated May 26, 1891.

Application filed March 15, 1890. Serial No. 344,016. (No model.)

*To all whom it may concern:*

Be it known that I, WILLIAM W. KEYS, a citizen of the United States, residing at Bridgeport, in the county of Fairfield and State of Connecticut, have invented certain new and useful Improvements in Melting-Furnaces; and I do hereby declare the following to be a full, clear, and exact description of the invention, such as will enable others skilled in the art to which it appertains to make and use the same.

My invention relates to melting-furnaces, but has especial reference to furnaces in which metals are melted by the heat developed from the burning of petroleum or other highly-inflammable hydrocarbon oils.

In my application for Letters Patent for improvement in the method of treating copper and its alloys, filed September 6, 1889, Serial No. 323,206, I have minutely described said method; and the object of my present invention is to provide a furnace which is especially adapted for carrying out said method, which shall thoroughly melt the metal in a minimum time and which more completely exposes the melting or molten metal to the deoxidizing agents.

As I have stated in said application, I have discovered that a very superior metal can be obtained by purifying and deoxidizing, especially in the instance of copper, and that the metal is well deoxidized by exposing it while melting or in a molten condition to direct contact with the products of combustion developed from the burning of inflammable oils, preferably crude petroleum.

In my present improvement the oil is burned within the furnace, or so adjacent thereto as to admit of the delivery of the products of combustion directly against the metal without being unduly combined with the atmospheric oxygen, it being important that combustion should be supported in the main by the oxygen in the melting or molten metal, in order that the resultant carbonic and hydric oxides as well as the volatile impurities of the metal may be eliminated therefrom and carried out of the furnace through the usual flue and stack.

In order that my invention may be fully understood I will refer by letter to the accompanying drawings, in which—

Figure 1:
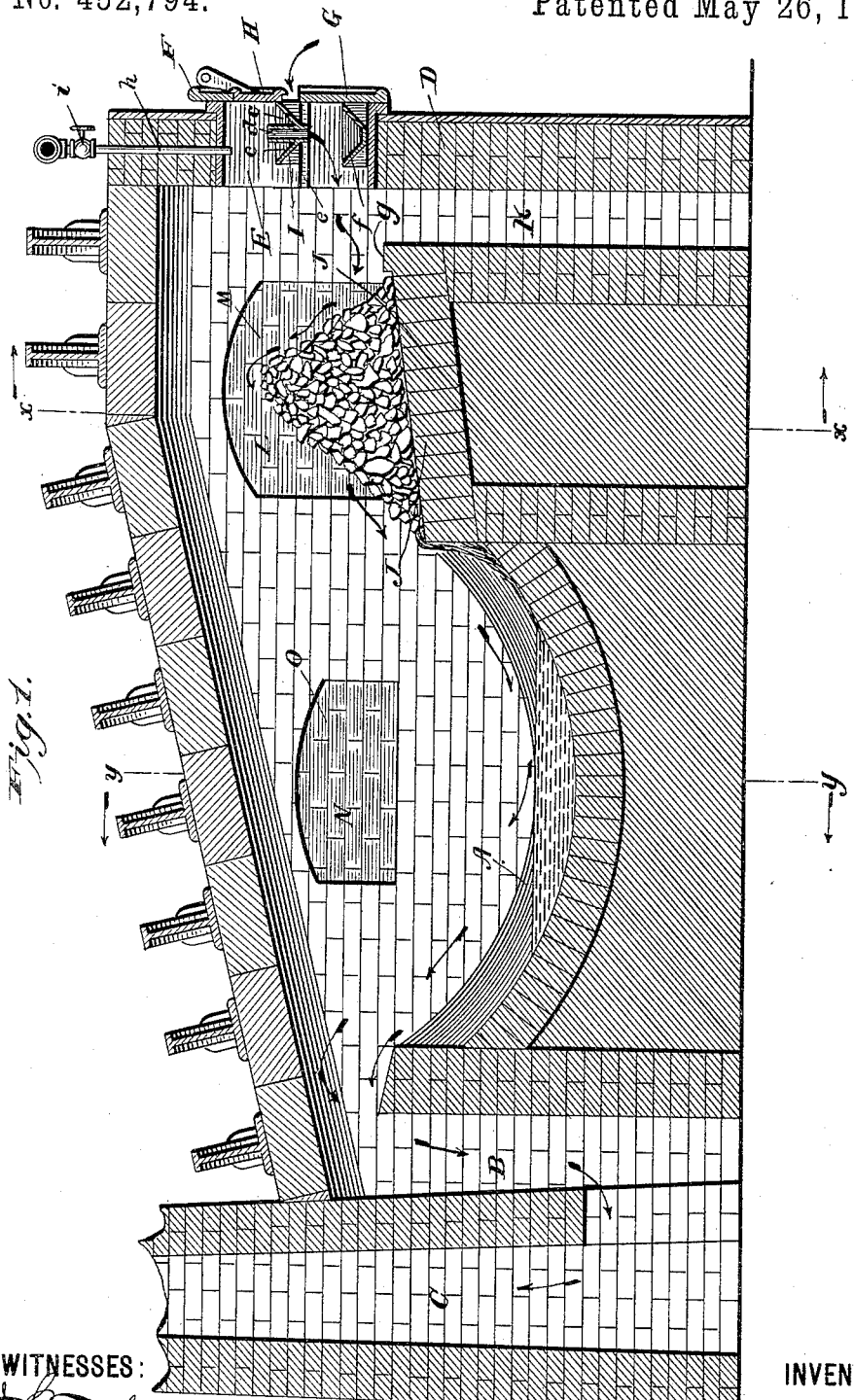
Figure 2:
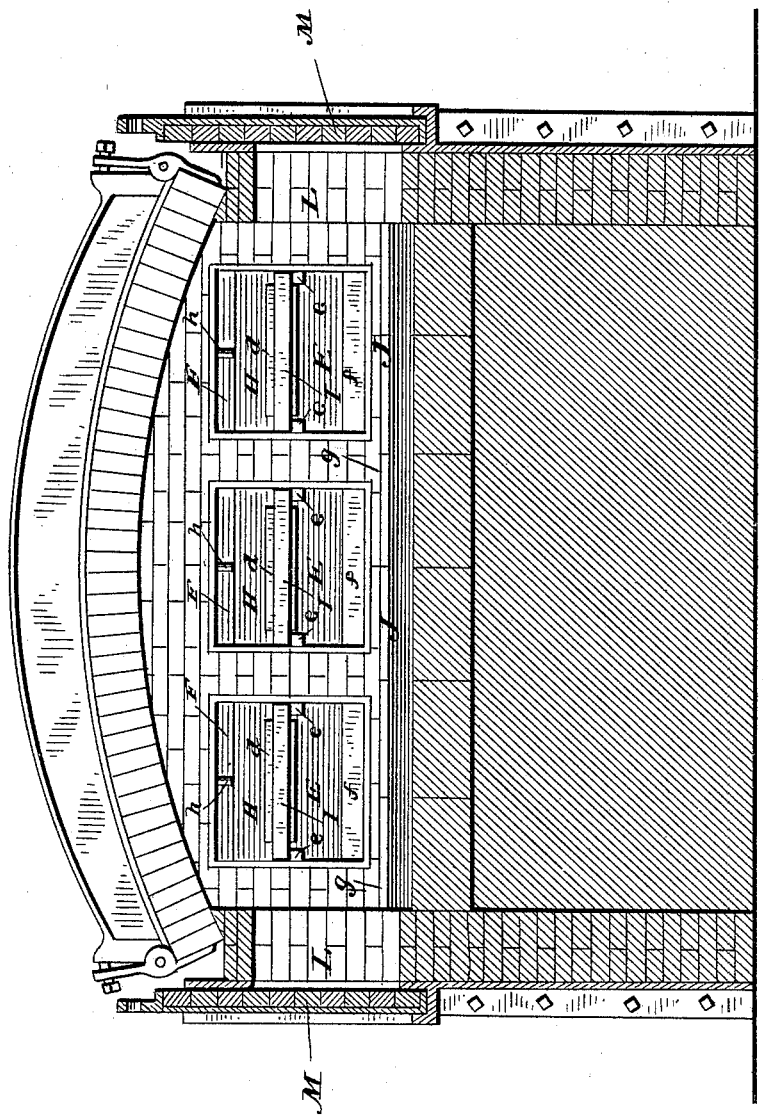

Figure 1 is a longitudinal sectional elevation illustrating my novel furnace. Figs. 2 and 3 are cross-sections at the lines $x\,x$ and $y\,y$, respectively, of Fig. 1; Fig. 4, a front elevation of my novel furnace, and Fig. 5 a detail perspective of the oil-burner.

Similar letters denote like parts in the several figures of the drawings.

In my novel furnace the pot A, flue B, and stack C are substantially the same as heretofore in metal-working furnaces.

In the front wall D of the furnace are openings E, which are guarded by plates F G, the former having doors H, while the latter are secured by means of screws $a$, which pass through elongated slots $b$, whereby said plates G may be adjusted up or down to act as dampers for the regulation of the supply of air, as will be presently set forth.

I use an approved style of burner I, which has a dished portion $c$ for holding the oil, and a central duct $d$ open at the top and bottom. These burners are mounted on ledges $e$ within the openings E, the outer edges of said burners being adjacent to and above the lower edges of the doors H. Below the burners are placed drip-pans $f$ to receive any accidental overflow of oil. Within and at the front portion of the furnace there is a melting shelf or floor J, which is inclined toward the pot A, and has at its highest or outer side a raised ledge $g$. Between this floor and the front wall of the furnace is an open space or pocket K. It sometimes occurs that portions of these burners and drip-pans become melted, and the object of the pocket K is to receive such melted iron, as well as masses of solid carbon liable to drop from the burners and pans, and also sputtering oil, it being important that all of these be kept from admixture with the metal to be smelted.

$h$ are vertical ducts which are led from any suitable oil-tank, and which overhang the dished portions of the burners. The supply of oil is regulated by means of suitable valves $i$.

L are openings in the side walls of the furnace at the ends of the floor J, and guarded by suitable doors M, whereby ingots, bars, or other masses of metal may be introduced and piled up on the said floor in loose or open piles, as shown at Fig. 1.

An opening N, guarded by a suitable door

O, is provided at the back of the furnace opposite the pot A, whereby ready access is afforded for stirring or skimming the molten metal.

The melting-shelf having the requisite amount of metal piled thereon, the doors H are opened to allow the drip-pans and burners to be properly located within the openings E, (provided said pans and burners are not already in position,) the oil is slowly supplied through the ducts $h$ and then ignited, the doors then closed and the draft of air regulated by the adjustment of the dampers G. The draft of air will create an induced current down through the burner-ducts $d$, thereby causing the products of combustion of the oil to be drawn through said ducts and then deflected by the draft of air against the bottom of the piled mass of metal on the floor J. As the heat of the furnace increases the dampers G are closed, because the supply of oxygen from the outer air is not needed to support combustion, the oxygen in the melting or molten metal affording ample support for combustion, and thereby effecting a deoxidization of the metal. The mass of metal in the pile gradually melts down, and all the while the products of combustion take more or less oxygen from the metal, and as the latter in a molten state flows downward and over the edge of the floor in thin streams it is further and favorably exposed to the deoxidizing products of combustion, and as the molten metal accumulates in the pot its temperature is raised and its oxygen still further given off to the carbon and hydrogen ever present and ready to unite with it in combustion, and during this final stage of the operation little or no atmospheric oxygen should be admitted to the furnace.

I have demonstrated by actual practice that the time required for the running of a heat of metal and for the deoxidization of the latter is materially reduced by the use of my novel furnace, and this is doubtless due to the fact that the metal as it gradually melts will yield up more or less of its oxygen, so that the molten metal accumulated in the pot will require less purifying than when the cold metal is placed directly in the pot and partially flooded in molten metal, or when, after a portion of the metal has been melted, cold metal is dropped therein.

The raised ledge $g$ prevents the melting metal from backing up and flowing into the pocket K.

The molten metal is discharged from the pot through the tap-hole P in the usual manner.

I of course lay no claim to the burner, and I can moreover use any well-known oil-burner, it being essential merely to direct the products of combustion against the metal to be melted.

What I do claim as new, and desire to secure by Letters Patent, is—

1. In a furnace for smelting metals by the heat developed from the burning of hydrocarbon oils within burners, the combination, with the hearth on which the metal to be melted is piled, of the burners supported within the front wall of the furnace, dampers within said wall for regulating the supply of atmospheric oxygen immediately beneath the burners, and the pocket in the immediate rear of said wall, substantially as set forth.

2. In a furnace for smelting metal by exposure to the hot products of combustion developed by burning hydrocarbon oils, the combination of the front wall having therein dampers for regulating a supply of oxygen, oil-burners I, located within said wall immediately behind said dampers, an inclined hearth on which the metal to be melted is piled, a pot toward which said hearth leads, and pipes by which oil is constantly supplied to the burners, substantially as set forth.

In testimony whereof I affix my signature in presence of two witnesses.

WILLIAM W. KEYS.

Witnesses:
F. W. SMITH, Jr.,
J. P. FINCH.